June 21, 1949.　　　　N. W. LYON ET AL　　　　2,473,656
MACHINE FOR FORMING ARTICLE SUPPORTING
PALLETS FOR WRAPPING MACHINES
Filed Dec. 12, 1947　　　　　　　　　　7 Sheets-Sheet 1

Fig. 1.

INVENTORS
NORMAN W. LYON AND
BY ROLAND E. BROWN
Chapin + Neal
ATTORNEYS

Patented June 21, 1949

2,473,656

UNITED STATES PATENT OFFICE 2,473,656

MACHINE FOR FORMING ARTICLE SUP-
PORTING PALLETS FOR WRAPPING
MACHINES

Norman W. Lyon and Roland E. Brown, Spring-
field, Mass., assignors to Package Machinery
Company, East Longmeadow, Mass., a corpora-
tion of Massachusetts Application December 12, 1947, Serial No. 791,268

6 Claims. (Cl. 154—30)

This invention relates to a device for cutting and forming supporting cards or pallets upon which articles are positioned prior to wrapping.

In the wrapping of articles such as candy bars it is customary to place the bar on a cardboard pallet prior to wrapping, the pallet giving support to the bar during the wrapping operation and providing an edge against which the folding of the wrapper may be accomplished without damage to the article. The use of the pallets in conjunction with properly designed wrapping instrumentalities also makes possible a relatively loose wrapping of the article which is desirable to prevent the surface of the candy bar, which surface is frequently a thin coating of chocolate, from being damaged.

The pallets commonly used for this purpose have been flat pieces of cardboard which, to secure the necessary longitudinal rigidity for properly supporting the candy bar during wrapping, has required a card thickness of approximately .022 of an inch. Such pallets have even greater relative resistance to bending transversely than longitudinally. This transverse rigidity in some cases is undesirable, as when a number of wrapped candy bars are packed or arranged in superposed layers, the substantially unyielding pallets of the upper layers tending to damage the tops of the underlying bars. The pallets also represent a substantial item in the wrapping cost. To reduce the wrapping cost and at the same time secure an improved product, it has been proposed to reduce the pallet thickness to approximately .014 inch thickness and provide the needed resistance to longitudinal bending by forming parallel corrugations longitudinally of the pallet. Because of the thinness of the pallet material the corrugations form a transversely yielding cushion as compared to the completely rigid pallets previously used and this, with the increased transverse flexibility, provides the desired loose wrap but without the unnecessary complete rigidity at the base of the article. The resulting loose but "softer" wrap has advantages in permitting the wrapped bar to adjust itself to the wrapper and pallet and decreases the possibility of damage in handling the bars and when a number of wrapped bars are packed together.

In the production of such a package substantial difficulty was however encountered in the forming and supplying of suitable pallets to the wrapping machine. Because of the tendency of the relatively soft thin material to tear, particularly at the speed of travel necessary to supply the needs of the high speed wrapping machines, conventional forming means are inadequate.

It is accordingly one purpose of the present invention to provide a machine which is capable of cutting and forming pallets of the above character at a speed commensurate with that of a high speed wrapping machine and in synchronism therewith.

A further object is to provide specific forming instrumentalities capable of acting on thin material traveling at high speed without damage to the material.

Other and further objects and advantages will be made apparent in the following specification and claims.

The operating parts of the machine, later to be described in detail, are carried by a frame generally indicated at 1 which is supported from side rails 2 mounted on legs or posts 3, the frame 1 being carried on cross bars 4 and 5 extending between the side rails.

Figure 2:
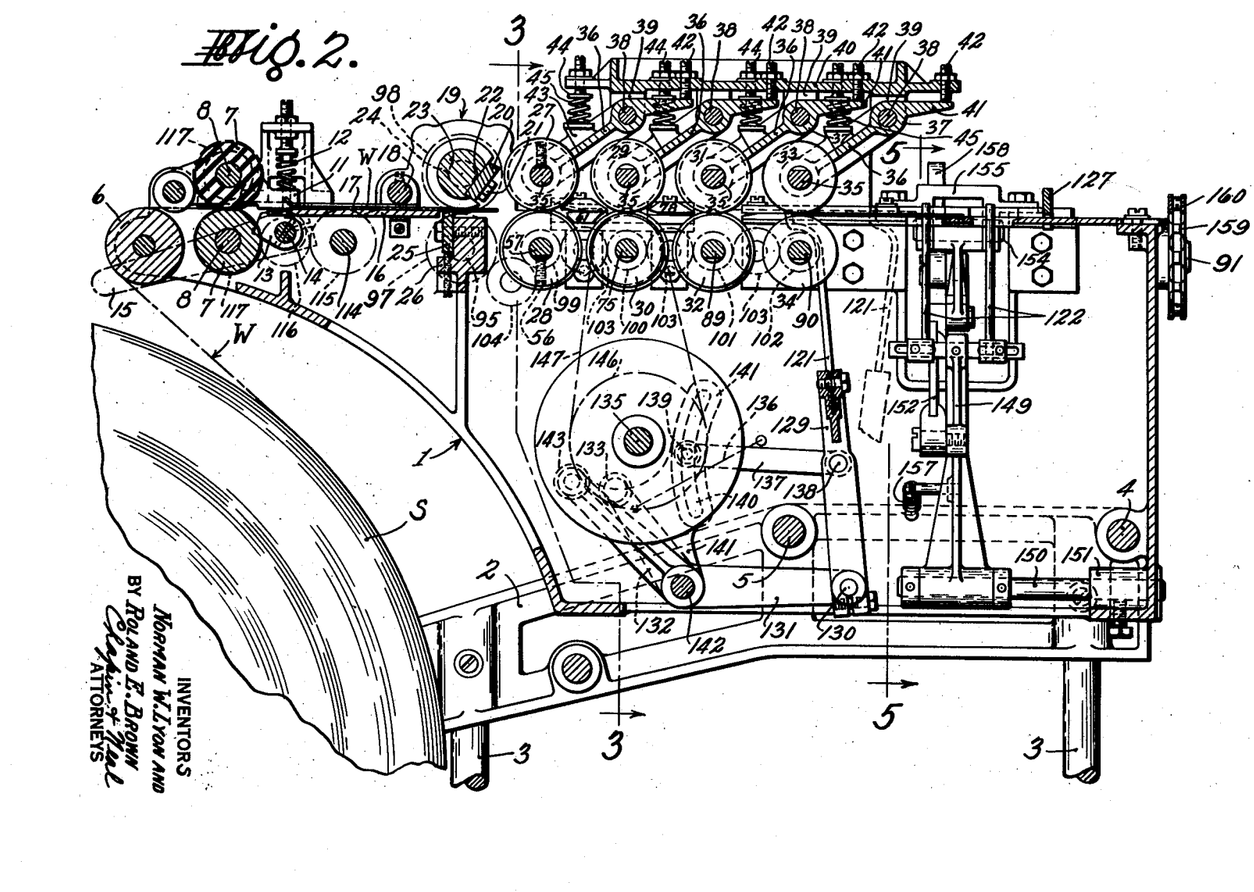
Fig. 2 is a sectional view substantially on line 2—2 of Fig. 1.

The material from which the pallets are to be formed is supplied in the form of a narrow web W from a roll S (Fig. 2) supported by means not shown from the side rails 2. From the supply S the web W is directed around a guide roll 6 and between advancing or measuring rolls 7 mounted on shafts 8, driven by means later described. The upper measuring roll, as shown in Fig. 2 is preferably formed of rubber.

The upper shaft 8 is journaled in a pair of spaced brackets 9 (Figs. 1 and 2) which are pinned to a cross shaft 10 pivoted at its ends in frame 1. Each bracket 9 is provided with a forward extension 11, which is engaged by an adjustable spring 12 providing the desired pressure for feeding the web into the machine. In threading the web into the machine the upper roll 7 may be raised against the pressure of the springs 12 by a cam 13 secured to stub shaft 14 provided at its outer end with an operating handle 15.

From the measuring rolls the web W advances over a plate 16 beneath a guide member 17, supported from a cross rod 18, to a cutting device generally indicated at 19. The cutting device comprises a blade 20 secured by bolts 21 to the slabbed off face 22 of a cylinder 23, the ends of which are turned down as at 24 to form a shaft turning in bearings formed in the main frame. Blade 20 cooperates with a stationary blade 25, adjustably secured to a cross member 26 to sever cards from the end of the web. As later described the knife 20 is rotated in timed relation to the measuring rolls 7 to sever pallets of desired length.

As the end of the web advances beneath and beyond the cutting blade 20 it passes successively between pairs of shaping rolls 27—28, 29—30, forming rolls 31—32, and feed rolls 33—34. The upper rolls 27, 29, 31 and 33 of the pairs are mounted on respective shafts 35, each of said shafts (Figs. 2 and 3) being mounted in a bifurcated arm 36 of identical bell cranks 37 pivoted on rods 38. The ends of the rods 38 are secured in spaced lugs 39 depending from a plate 40. The other arms 41 of the bell cranks engage adjustable stop screws 42, threaded in plate 40, which limit the downward movement of the arms 36 and the rolls carried thereby. The arms 36 are provided with lugs 43 between which and collared pins 44, adjustably threaded into plate 40, are positioned compression springs 45. By suitably adjusting the stop screws 42 and the spring pins 44 the spacing between the rolls of the several pairs and the pressure exerted by the upper roll of each pair may be nicely adjusted to properly operate upon cards of different thickness and quality of material.

Figure 1:
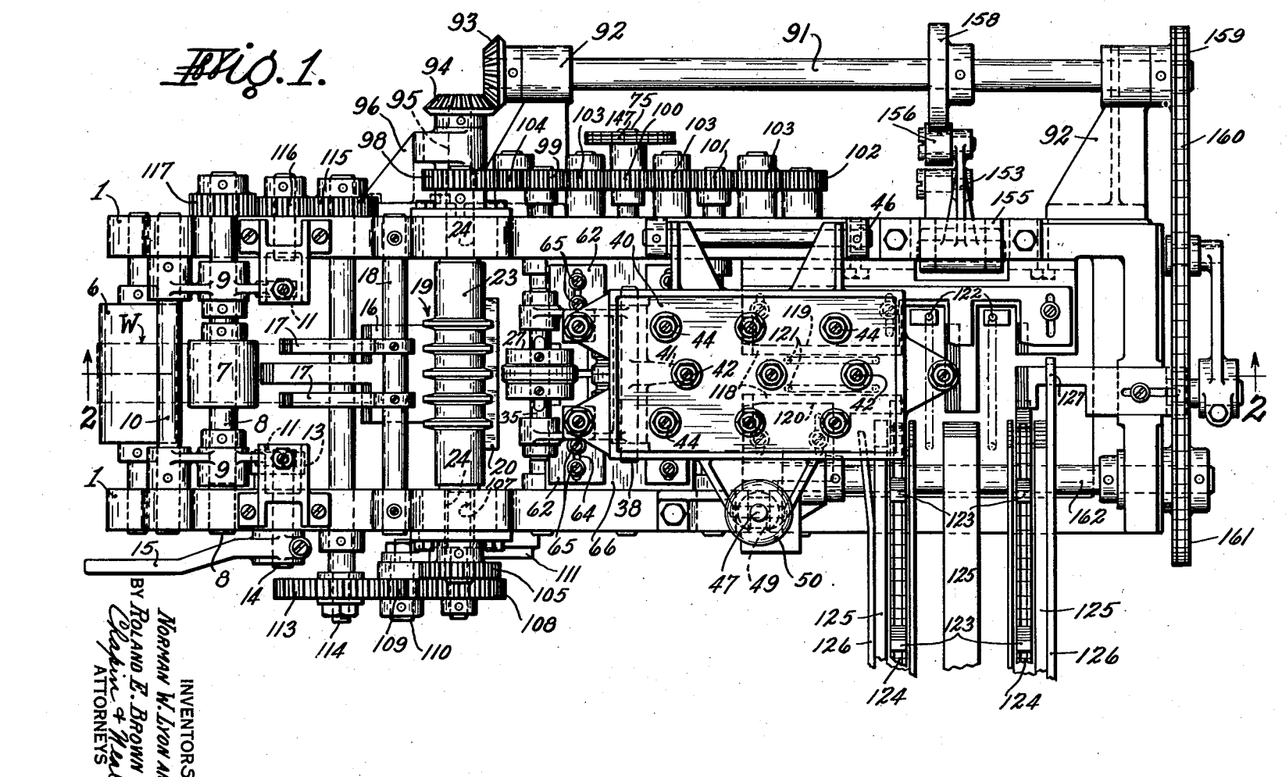
Fig. 1 is a top plan view of a device embodying the invention.
Figure 3:
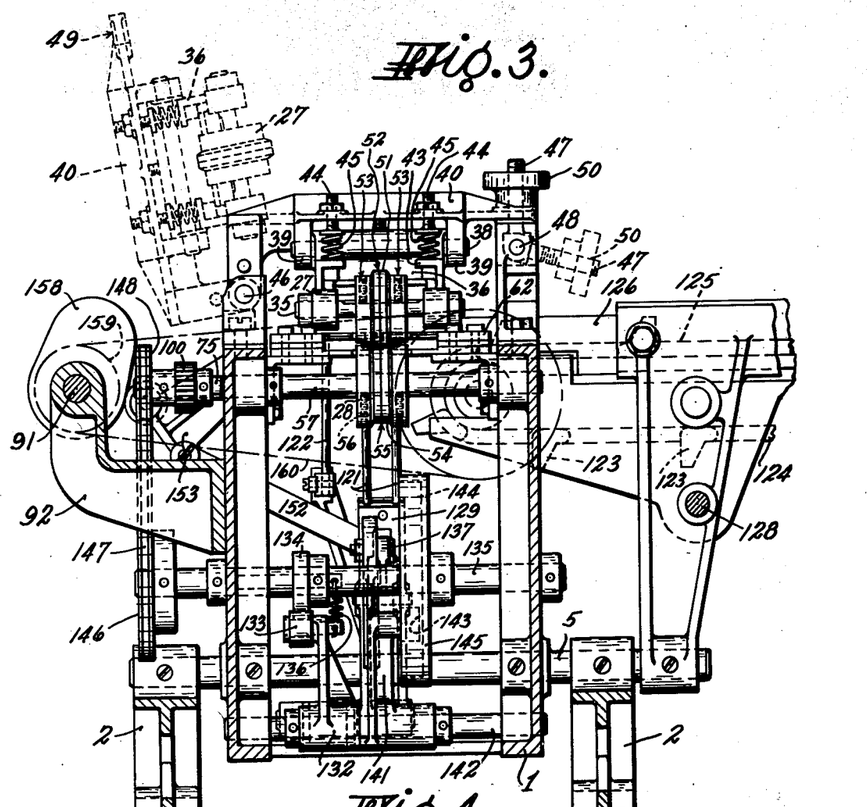
Fig. 3 is a sectional view substantially on line 3—3 of Fig. 2.

As best shown in Figs. 1 and 3 the plate 40 is pivoted at 46 to the frame 1 to be swung out of operative position to the position shown in dotted lines in Fig. 3, thereby providing access to the lower rolls and the parts associated therewith. The plate 40 is clamped in operative position by a latch 47 pivoted at 48 to the frame 1 and engaging in a slot 49 in the plate, a nut 50, threaded on the latch, clamping the plate tightly in place.

Figure 12:
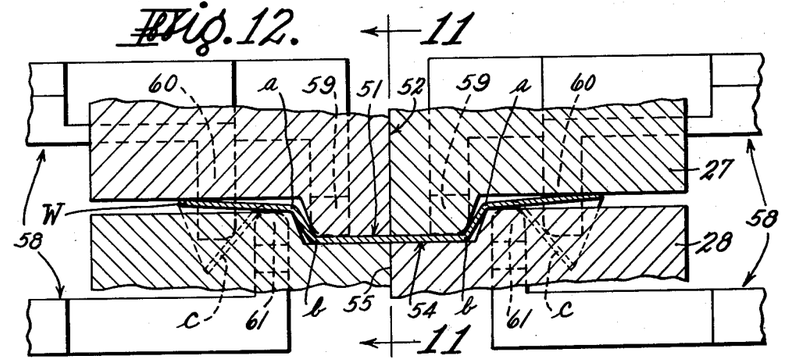
Fig. 12 is a sectional view substantially on line 12—12 of Fig. 11.

As shown in Figs. 3 and 12 the upper shaping roll 27 is formed with a central rib 51, the roll being centrally split as at 52, the halves being adjustably secured by set screws 53 to the roll shaft 35. The lower roll 28 is formed with a central groove 54 into which the rib 51 of the upper roll extends. The lower roll is centrally split as at 55, the halves being adjustably secured by set screws 56 to a shaft 57 journaled in the side frames. The stop screws 42 and spring pins 44 are so set that, as best shown in Fig. 12, the center portion of the web W is engaged between the peripheral faces of the rib 51 and the bottom of the groove 54 for firm driving engagement with the central portion of the web. At each side of the rib 51 the spacing between the roll faces is, as clearly shown in Fig. 12, sufficient to permit the free side portions of the web to be drawn inwardly and freely bent into a general channel shape.

The lower rolls 28, 30, 32 and 34 are driven, by means later described, at a speed in excess of the web advancing rolls 7. Until the cutter operates to sever a pallet from the end of the web, the central driving portions of the rolls 27 and 28 slip on the web but maintain it taut during the cutting operation. The severed pallet is then fed forward at the speed of the rolls 27 and 28, thus spacing the severed pallets from each other as they pass through the device.

Figure 11:
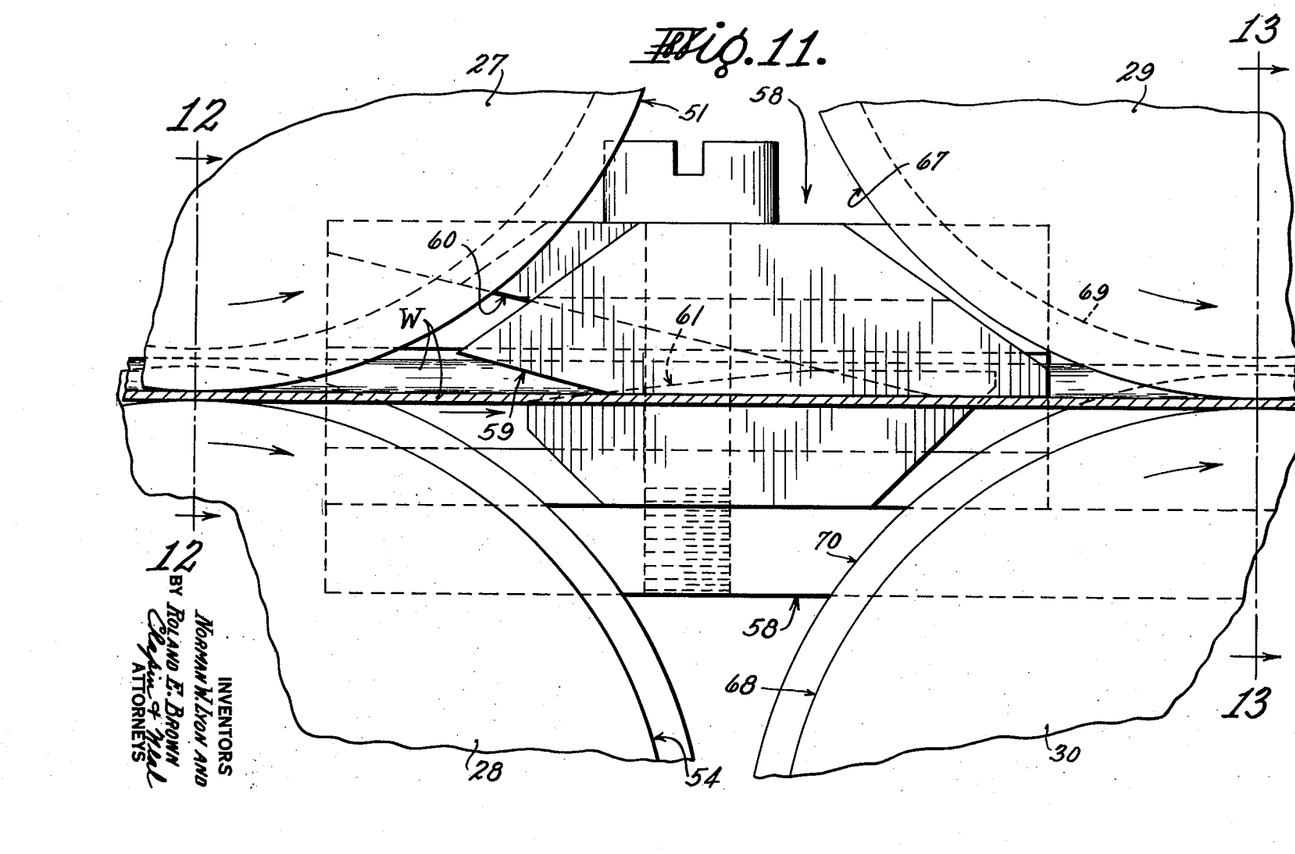
Fig. 11 is an enlarged fragmentary longitudinal sectional view substantially on line 11—11 of Fig. 12.

From the rolls 27—28 the web passes through side guides, generally indicated at 58, to the rolls 29—30. As shown in Figs. 2 and 11 the guides 58 substantially bridge the gap between the bites of rolls 27—28 and rolls 29—30, maintaining the shape of the partially shaped web as it passes from one set of rolls to the other and further shaping the edge portions preparatory to the further bending operation of rolls 29 and 30.

Figure 4:
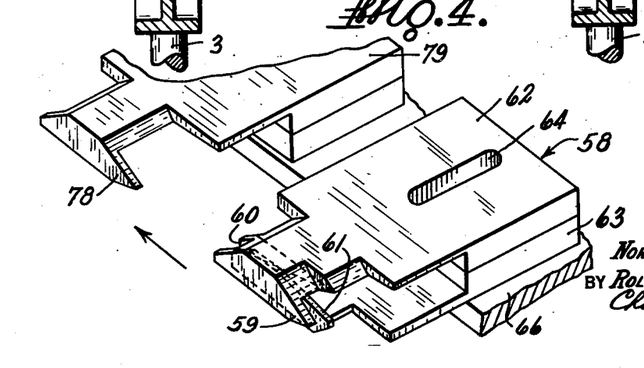
Fig. 4 is a generally perspective detail view of one of the folders and one of the fold retainers.

The guides 58 at the right hand side of the web as viewed in Fig. 12 are shown in a generally perspective view in Fig. 4. As shown in Figs. 4 and 12 the guides 58 each comprise two downwardly extending spaced members 59 and 60 and an intermediate member 61 extending upwardly between the members 59 and 60. As best shown in Fig. 12 when the web leaves the rolls 27—28 the underside of the web is engaged by the members 61 adjacent the upper fold on bend a and the upper face of the web is engaged by the folders 59 adjacent the lower fold or bend b thus preserving the shaping imparted to the web by the rolls 27—28. As the web advances further through the guides 58 the upper face of the edge portions of the web outwardly of member 61 are engaged by the downwardly inclined edges of the guides 60 which bend the outer edge portions downwardly as indicated at c in Fig. 12.

Figure 6:
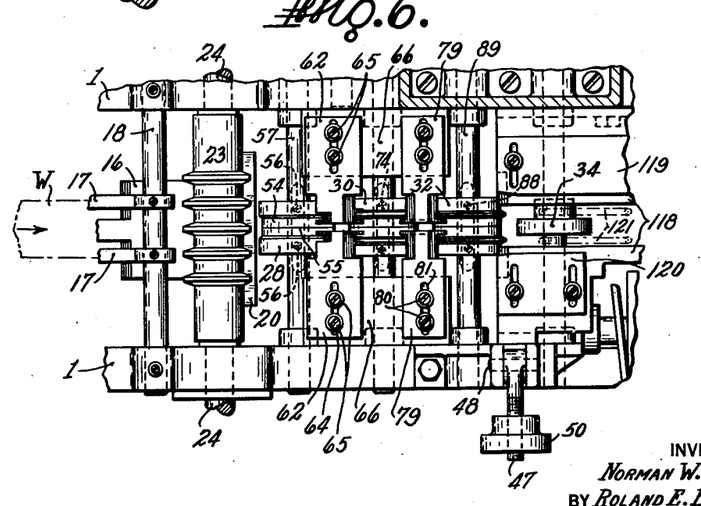
Fig. 6 is a fragmentary top plan view with parts broken away, the upper shaping and forming rolls having been swung to the dotted line position shown in Fig. 3.

The members 59 and 60 are carried by blocks 62, and members 61 are carried by blocks 63, these blocks being provided with elongated slots 64 through which bolts 65 extend to adjustably secure the blocks to brackets 66 (Fig. 6) carried by the main frame.

Figure 8:
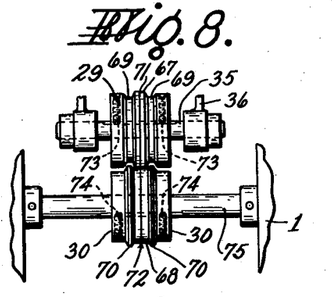
Fig. 8 is a fragmentary detail view of the second pair of shaping rolls.
Figure 9:
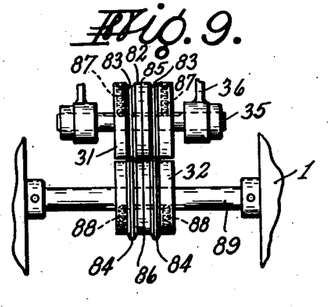
Fig. 9 is a similar view of the forming rolls.
Figure 13:
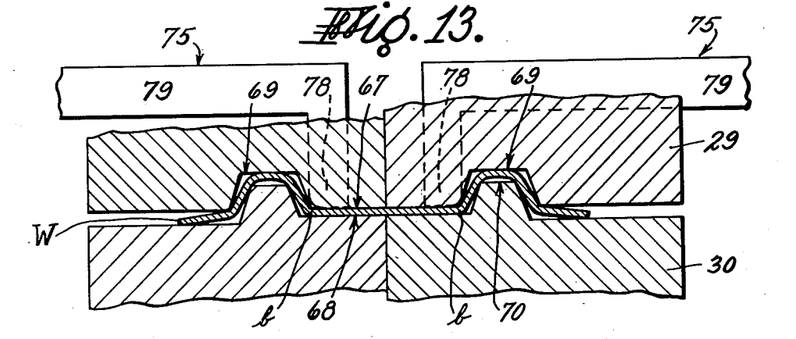
Fig. 13 is a sectional view substantially on line 13—13 of Fig. 11.

From the members 58 the pallet enters between rolls 29—30, Figs. 8 and 13. The upper roll 29 is formed with a central rib 67, similar to rib 51 of roll 27, which extends into a groove 68 in the lower roll 30, similar to groove 54 of roll 28. Outwardly of rib 67, roll 29 is provided with peripheral grooves 69, and roll 30 is provided with peripheral ribs 70 which enter grooves 69. As in the case of rolls 27—28 the central portion of the pallet is gripped between the peripheral surface of rib 67 and groove 68 to drive the pallet while, as clearly shown in Fig. 13, the remaining faces of the ribs and grooves are spaced sufficiently to permit the material of the pallet to follow the contours of the rolls without substantial resistance. The pallet is thus shaped to approximate form without any substantial strain even when traveling at high speed and when formed of relatively thin material. The rolls 29 and 30 are centrally split as at 71 and 72, respectively, the halves of roll 29 being adjustably secured by set screws 73 to a shaft 35 while the halves of the lower roll are secured by set screws 74 to a shaft 75.

Figure 14:
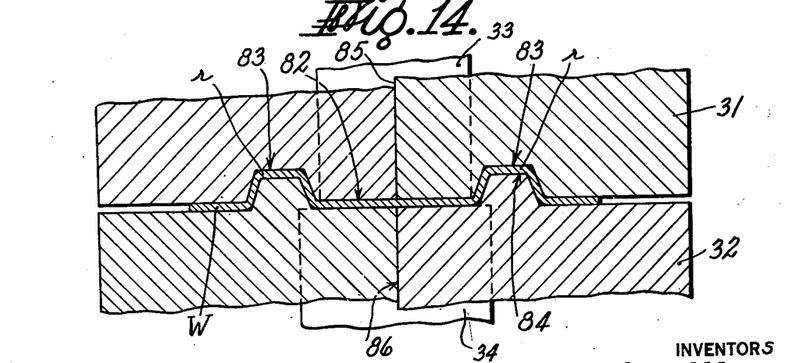
Fig. 14 is a similar sectional view through the forming rolls.

From the rolls 29—30 the pallets pass through side guides, generally indicated at 78 to the final forming rolls 31—32. As shown in Figs. 4 and 13 the guides 78 comprise downwardly extending members 78 which engage the upper face of the web adjacent the bend on fold b. The members 78 are supported by blocks 79 which are adjustably held to the brackets 66 (Fig. 6) by machine screws or bolts 80 extending through slots 81 in the blocks. The upper roll 31 is formed with a central rib 82 and peripheral grooves 83 while lower roll 32 is provided with peripheral ribs 84, the contour of the rolls 31 and 32 being similar to that of the rolls 29 and 30 respectively, except that as shown in Fig. 14 the pallets are tightly engaged between the cooperating ribs and grooves across their entire width to firmly and permanently shape the pallets to final form. The rolls 31 and 32 are centrally split as at 85 and 86 respectively, the halves of roll 31 being adjustably secured by set screws 87 to a shaft 35 while the halves of the lower roll 32 are secured by set screws 88 to a shaft 89.

As will be apparent from Figs. 12, 13 and 14 the web and pallets are centrally gripped throughout the shaping and forming operation. The edge portions are loosely bent or shaped by the rolls 27—28 and 29—30, the resulting narrowing of the web taking place without substantial resistance, and the pallet is finally permanently formed, with two spaced elevated ribs r, between the rolls 31 and 32, without having been subjected to any substantial transverse strain. By this arrangement pallets formed of thin stock of the order of .014 of an inch may be formed at the high speed necessary to supply a high speed wrapping machine, resulting in a saving in material cost of approximately 35%.

Figure 10:
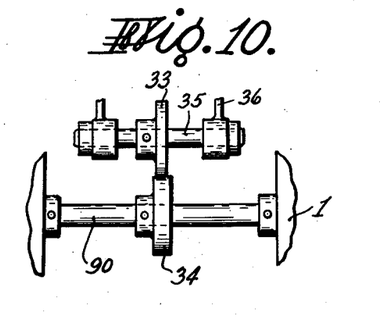
Fig. 10 is a similar view of the final drawing or feeding rolls.

Upon leaving the rolls 31 and 32 the pallets are engaged by feed rolls 33 and 34, Figs. 2, 10 and 14. The upper feed roll is secured to a shaft 35 while lower roll 34 is secured to a shaft 90.

The various measuring, feeding, cutting, shaping and forming rolls above described are driven from a shaft 91, Fig. 1, journaled in brackets 92. At one end shaft 91 is provided with a bevel gear 93 which meshes with a bevel gear 94 secured to stub shaft 95 journaled in a bracket 96. Stub shaft 95 carries a gear 97 (Fig. 2) which meshes with a gear 98 secured to one end of shaft 24 which carries the cutting blade 20.

As shown in Figs. 1 and 2 the shafts 57, 75, 89 and 90 which respectively carry the lower rolls 28, 30, 32 and 34, are provided with gears 99, 100, 101 and 102 connected into a train by intermediate pinion gears 103, the train being driven from gear 97 through pinion gear 104.

Figure 7:
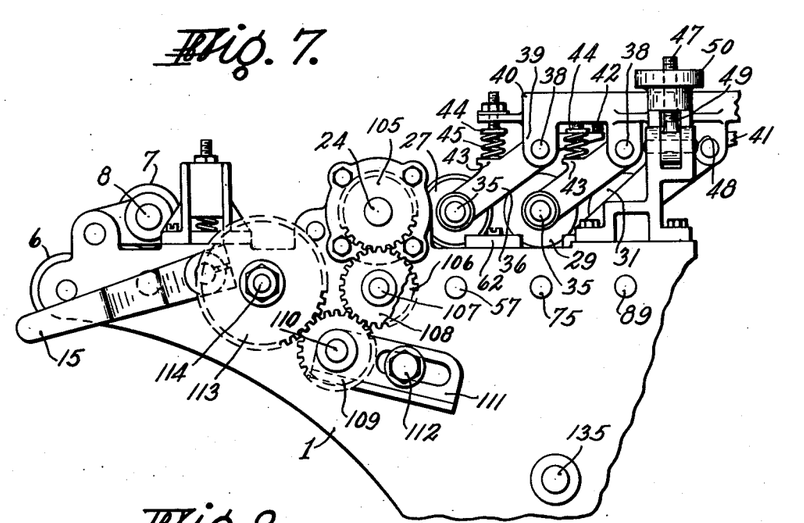
Fig. 7 is a fragmentary elevational view showing the changeable gear drive.

The other end of cutting blade shaft 24 carries a gear 105 (Fig. 7) which meshes with a gear 106 secured to a stub shaft 107 which carries a second gear 108. Gear 108 meshes with a pinion 109 carried by a stub shaft 110 secured in a bracket 111 adjustably secured to frame 1 by a bolt 112. Pinion 109 meshes with a change gear 113 (Figs. 1 and 7) removably secured on one end of a shaft 114, the other end of which carries a gear 115 (Fig. 1) meshing with a pinion 116 which drives meshing gears 117 secured to the shafts 8 of the measuring rolls 7. As will be apparent the speed of the measuring rolls 7, relative to the rotary cutter may be increased or diminished by substitution of a larger or smaller gear at 113, with an appropriate adjustment of pinion 109, so as to cut pallets of desired length from the web.

The completed pallets are discharged (Figs. 1 and 2) by the feed rolls 33 and 34 onto a slotted plate 118 (Fig. 6) provided with side guides 119 and 120 adjustably secured thereto. As the pallets leave the bite of the feed rolls 33 and 34 their trailing edge is engaged by a pair of transfer fingers 121 which in their movement from full line position to dotted line position in Fig. 2 transfer the pallets to a position in front of a second pair of transfer fingers 122. Transfer fingers 122 operate in a direction at right angles to the movement of fingers 121 (Fig. 1) and serve to move the pallets transversely into position to be engaged by lugs 123 on spaced conveyor sprocket chains 124 which deliver the pallets along supporting rails 125 to the wrapping instrumentalities, not shown. As the pallets are advanced by the conveyor 124 they pass between centering guides 126, one of the latter being extended as at 127 to form a stop for the pallets as they are delivered by the fingers 121. The guides 126 are supported by suitably threaded shafts, one of which is shown at 128, to provide adjustment to accommodate pallets of different lengths.

The transfer fingers 121 which move in an elliptical path are carried by a member 129 (Fig. 2) pivoted at its lower end, as at 130 to the end of one arm 131 of a bell crank, the other arm 132 of which carries a cam roll 133 engaging a cam 134 (Fig. 3) secured to a rotating shaft 135, by which the up and down component of motion is imparted to the member 129. A tension spring 136 holds cam roll 133 against cam 134. The forward and back component of the elliptical movement of the fingers 121 is imparted to member 129 through a link 137 having one end pivoted to the member at 138, the other end being adjustably pivoted at 139 in an arcuate slot 140 formed in a webbed lever member 141 pivotally mounted on shaft 142. The member 141 carries a cam roll 143 riding in the groove 144 of a cam 145 (Fig. 3). The slot 140 is formed with the pivot 138 as a center, thus the rearward position of the fingers 121 remains constant while the extent of forward movement of the fingers may be increased or decreased, to accommodate different pallet lengths, by raising or lowering pivot 139 in slot 140. The end of cam shaft 135 is provided with a sprocket 146 (Fig. 3) connected by a sprocket chain 147 to a sprocket 148 secured to shaft 75 outwardly of its driving gear 100.

Figure 5:
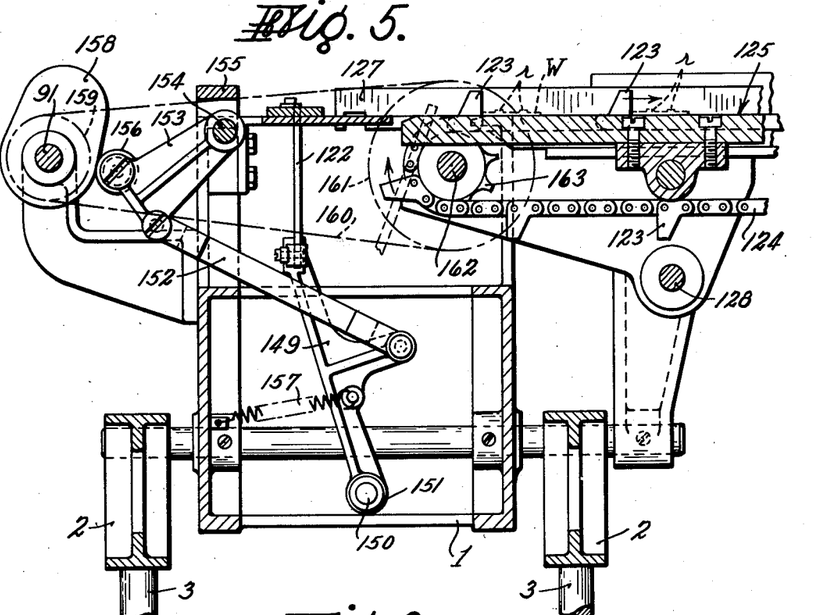
Fig. 5 is a sectional view substantially on line 5—5 of Fig. 2.

The transfer fingers 122 are adjustably carried by an arm 149 (Figs. 2 and 5) pivoted on a stub shaft 150 mounted in a boss 151, formed on the main frame. Arm 149 is connected by a link 152 to an arm 153 pivoted at one end on a pivot shaft 154 mounted in a bracket 155. The arm 153 carries a cam roll 156 held by a spring 157 against a cam 158 secured to shaft 91. As will be apparent from Fig. 5 the shape of cam 158 imparts a quick forward thrust and return of fingers 122 to advance the pallets, previously centered at the rear of the conveyor by fingers 121, into the path of the lugs 123 of the conveyor chains as the fingers 121 are returning to initial position.

Shaft 91 carries a sprocket 159 which is connected by a sprocket chain 160 to a sprocket 161 secured to shaft 162 to which are secured the sprockets 163 which carry the conveyor chains 124, the latter thus transmitting power from the wrapping machine, not shown, to the main drive shaft 91.

What we claim is:

1. A machine for making article supporting pallets for wrapping machines which comprises, means for forming transversely spaced longitudinal corrugations in said pallets, said means including successive pairs of shaping and forming rolls, means for feeding a web of thin cardboard to said rolls, means positioned between said feeding means and the initial pair of shaping rolls to sever a pallet formnig length of material from the web after the leading end thereof is frictionally engaged between the initial pair of shaping rolls, means driving said rolls at a speed in excess of the speed of said feeding means to space the pallets as they pass through the shaping and forming rolls, a conveyor for advancing the pallets into a wrapping machine at a predetermined rate and in a predetermined spaced relation, means for transferring the pallets from the final pair of forming rolls to said conveyor, said last-named means including two pairs of oscillating pusher fingers successively engaging the trailing end and a side edge of the pallets, means driving said feeding means, severing means, shaping and forming means and transfer means from said conveyor, means to change the speed of the feeding means relative to the speed of the other of said means, to adjust the length of said pallets and means to independently adjust the throw of said pusher fingers.

2. A machine for making article supporting pallets for wrapping machines which comprises means for advancing a web of thin cardboard, means for severing pallet length strips from said web, opposed forming rolls contoured to form spaced parallel longitudinal corrugations in the pallets, means positioned between the web advancing means and said forming rolls to freely bend the material of the pallets into corrugated shape prior to entering the forming rolls, feed rolls engaging the pallets between the corrugations as the pallets leave the forming rolls, a continuously moving conveyor having spaced lugs and traveling at right angles to the path of movement of the pallets, a pair of oscillating fingers engaging the trailing end edge of the pallets as they leave the feed rolls to move them into centered position at the rear end of the conveyor, and a pair of fingers oscillating in the direction of conveyor movement to advance the pallets from the last-named position to a position to be engaged by the lugs of the conveyor.

3. A machine for making article supporting pallets for wrapping machines which comprises feed rolls for advancing a web of thin cardboard, means for severing pallet length strips from said web, opposed forming rolls contoured to form spaced parallel longitudinal corrugations in the pallets, and means positioned between the feed rolls and forming rolls to freely bend the material of the pallets into corrugated shape prior to entering the forming rolls.

4. A machine for making article supporting pallets for wrapping machines which comprises means for advancing a web of thin cardboard, oppositely paired shaping rolls to which the web is fed by said advancing means, a cutter positioned between the advancing means and the shaping rolls to sever pallets of predetermined length from the web, the shaping rolls making driving engagement with the longitudinal central portion only of the web and severed pallets, the outer end portions of the shaping rolls being contoured to freely bend the edge portions of the pallets into parallel corrugations one at each side of the engaged central portion, a pair of opposed contoured forming rolls making a driving engagement over the entire width of the pallets to permanently set the corrugations in the pallets and stationary side guides engaging the edge portions of the pallets between the shaping and forming rolls to maintain the shape of the corrugations during the passage of the pallets from the shaping rolls to the forming rolls.

5. A machine for making article supporting pallets for wrapping machines which comprises means for advancing a web of thin cardboard, oppositely paired shaping rolls to which the web is fed by said advancing means, a cutter positioned between the advancing means and the shaping rolls to sever pallets of predetermined length from the web, the shaping rolls making driving engagement with the longitudinal central portion only of the web and severed pallets, the outer end portions of the shaping rolls being contoured to freely bend the edge portions of the pallets into parallel corrugations one at each side of the engaged central portion, a pair of opposed contoured forming rolls making a driving engagement over the entire width of the pallets to permanently set the corrugations in the pallets and stationary side guides engaging the edge portions of the pallets between the shaping and forming rolls to maintain the shape of the corrugations during the passage of the pallets from the shaping rolls to the forming rolls, means to drive one member of each pair of shaping and forming rolls at a speed in excess of that of the web advancing means, independently adjustable spring means pressing the other member of each pair toward the driven member of the pair and adjustable means which limit the extent of movement of the spring pressed rolls toward the driven rolls.

6. A machine for making article supporting pallets for wrapping machines which comprises means for advancing a web of thin cardboard, oppositely paired shaping rolls to which the web is fed by said advancing means, a cutter positioned between the advancing means and the shaping rolls to sever pallets of predetermined length from the web, the shaping rolls making driving engagement with the longitudinal central portion only of the web and severed pallets, the outer end portions of the shaping rolls being contoured to freely bend the edge portions of the pallets into parallel corrugations one at each side of the engaged central portion, a pair of opposed contoured forming rolls making a driving engagement over the entire width of the pallets to permanently set the corrugations in the pallets and stationary side guides engaging the edge portions of the pallets between the shaping and forming rolls to maintain the shape of the corrugations during the passage of the pallets from the shaping rolls to the forming rolls, rotatable shafts upon which said rolls are respectively secured, each of said rolls being centrally split along planes at right angles to their axes of rotation, and means to secure the roll halves in adjusted position on their respective shafts to predetermine the spacing of the corrugations formed in the pallets.

NORMAN W. LYON.
ROLAND E. BROWN.

No references cited.